(12) United States Patent
Clark et al.

(10) Patent No.: US 10,961,861 B2
(45) Date of Patent: Mar. 30, 2021

(54) STRUCTURAL SUPPORT FOR BLADE OUTER AIR SEAL ASSEMBLY

(71) Applicant: United Technologies Corporation, Farmington, CT (US)

(72) Inventors: Thomas E. Clark, Sanford, ME (US); William M. Barker, North Andover, MA (US)

(73) Assignee: Raytheon Technologies Corporation, Waltham, MA (US)

( * ) Notice: Subject to any disclaimer, the term of this patent is extended or adjusted under 35 U.S.C. 154(b) by 57 days.

(21) Appl. No.: 16/055,576

(22) Filed: Aug. 6, 2018

(65) Prior Publication Data

US 2020/0040755 A1 Feb. 6, 2020

(51) Int. Cl.
*F01D 11/08* (2006.01)
*F02C 7/28* (2006.01)
(Continued)

(52) U.S. Cl.
CPC .............. *F01D 11/08* (2013.01); *F02C 7/28* (2013.01); *F05D 2220/32* (2013.01); *F05D 2240/11* (2013.01); *F05D 2240/55* (2013.01)

(58) Field of Classification Search
CPC .......... F01D 11/08; F01D 5/12; F01D 11/122; F01D 11/005; F01D 25/243;
(Continued)

(56) References Cited

U.S. PATENT DOCUMENTS 7,338,253 B2 * 3/2008 Nigmatulin ........... F01D 11/005
415/139
10,443,420 B2 * 10/2019 Sippel ................... F01D 11/005
(Continued)

FOREIGN PATENT DOCUMENTS

EP 1965031 A2 9/2008
EP 3106620 A1 12/2016
(Continued)

OTHER PUBLICATIONS

European Search Report for EP Application No. 19190118.0 dated Dec. 19, 2019.

*Primary Examiner* — Michael Lebentritt
*Assistant Examiner* — Eric J Zamora Alvarez
(74) *Attorney, Agent, or Firm* — Carlson, Gaskey & Olds, P.C.

(57) ABSTRACT

A gas turbine engine turbine section includes at least one blade extending radially outwardly to an outer tip. A blade outer air seal assembly is positioned radially outwardly of the radially outer tip. The blade outer air seal has forward and aft hooks. The forward and aft hooks are supported on forward and aft seal hooks of an attachment block. The attachment block has a forward case mount hook and an aft case mount hook. The attachment block is supported on a forward case hook and an aft case hook of a static casing within the engine. The forward case mount hook and the aft case mount hook on the attachment block face in a common axial direction. The forward case hook and the aft case hook face in a common axial direction which is opposed to the common axial direction. A method is also disclosed.

2 Claims, 6 Drawing Sheets

(51) Int. Cl.
*F01D 25/24* (2006.01)
*F01D 11/22* (2006.01)

(58) Field of Classification Search
CPC .......... F01D 25/246; F01D 25/28; F02C 7/28; F05D 2220/32; F05D 2240/11; F05D 2240/55; F05D 2300/6033
See application file for complete search history.

(56) References Cited

U.S. PATENT DOCUMENTS

| | | |
|---|---|---|
| 2009/0096174 A1 | 4/2009 | Spangler et al. |
| 2009/0110546 A1 | 4/2009 | Tholen et al. |
| 2014/0223920 A1* | 8/2014 | Stevens ................. F01D 25/246 60/796 |
| 2017/0101882 A1* | 4/2017 | Sippel ................... F01D 11/005 |
| 2017/0298777 A1 | 10/2017 | Lamusga |

FOREIGN PATENT DOCUMENTS

| | | |
|---|---|---|
| EP | 3141703 A1 | 3/2017 |
| EP | 3219934 A1 | 9/2017 |

\* cited by examiner

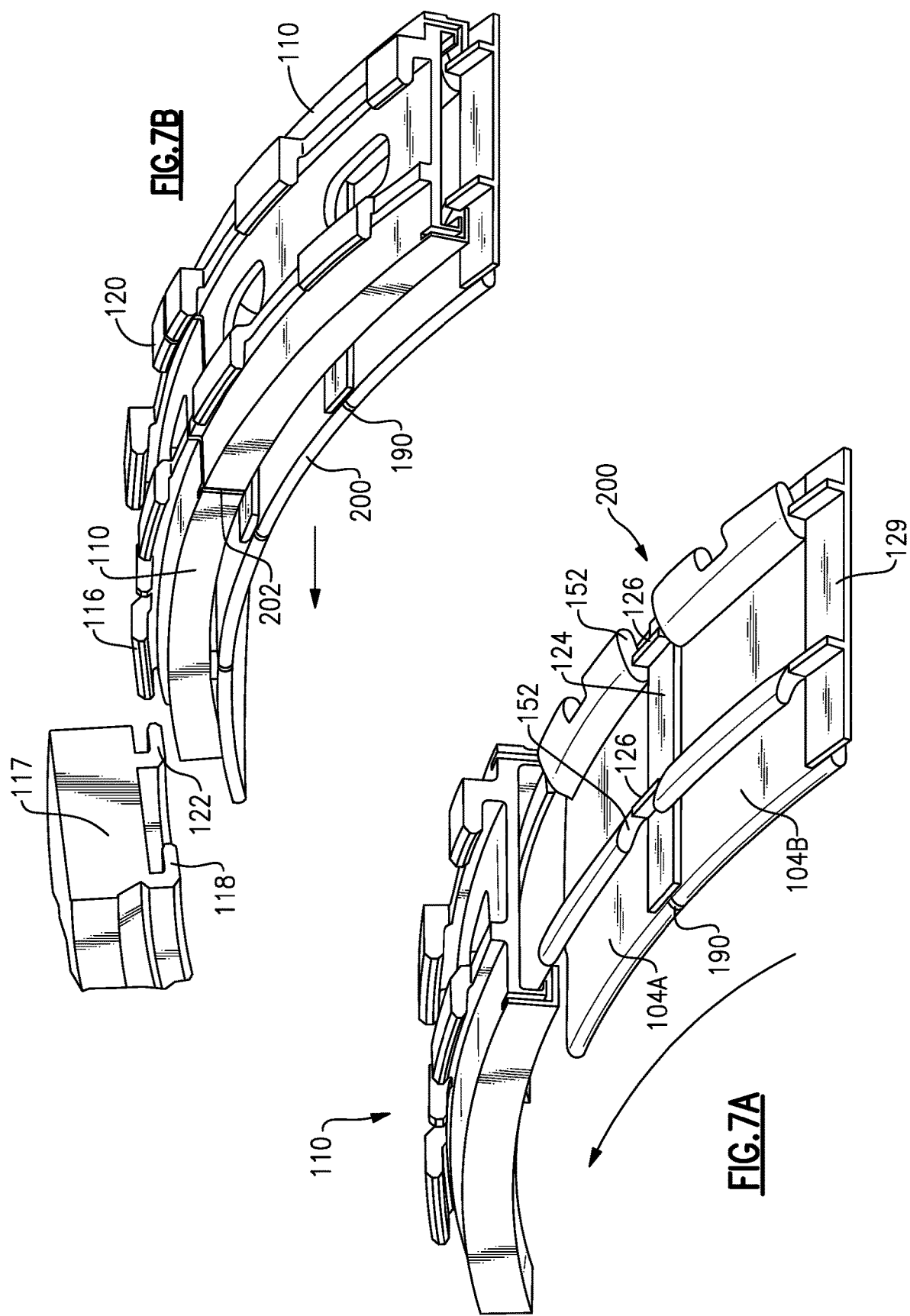

STRUCTURAL SUPPORT FOR BLADE OUTER AIR SEAL ASSEMBLY

BACKGROUND

This application relates to a structural support for supporting a blade outer air seal in a gas turbine engine.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades.

Blade outer air seals raise challenge in effectively mounting their assemblies to the engines.

SUMMARY

In a featured embodiment, a gas turbine engine includes a compressor section and a turbine section. The turbine section includes at least one rotor and at least one blade extending radially outwardly from the rotor to a radially outer tip. A blade outer air seal assembly is positioned radially outwardly of the radially outer tip of the blade. The blade outer air seal has forward and aft hooks. The forward and aft hooks are supported on forward and aft seal hooks of an attachment block. The attachment block has a forward case mount hook and an aft case mount hook. The attachment block is supported on a forward case hook and an aft case hook of a static casing within the engine. The forward case mount hook and the aft case mount hook on the attachment block face in a common axial direction. The forward case hook and the aft case hook face in a common axial direction which is opposed to the common axial direction.

In another embodiment according to the previous embodiment, there are a plurality of blade outer air seals mounted within the casing, and there are wedge seals spanning a circumferential gap between adjacent ones of the plurality of blade outer air seals.

In another embodiment according to any of the previous embodiments, the wedge seals include portions positioned radially inward of the forward and aft seal hooks of the attachment block, and there are stops formed on the wedge seal circumferentially between the forward and aft hooks on, the blade outer seals adjacent ones of hooks.

In another embodiment according to any of the previous embodiments, the forward and aft seal hooks on the attachment block extend circumferentially beyond circumferential edges of the blade outer air seals forward and aft hooks.

In another embodiment according to any of the previous embodiments, the wedge seal has a curved radially inner surface.

In another embodiment according to any of the previous embodiments, the curved radially inner surface of the wedge seal seals against a frusto-conical surface on the blade outer air seal.

In another embodiment according to any of the previous embodiments, the curved radially inner surface of the wedge seal seals on a curved surface of the blade outer air seal.

In another embodiment according to any of the previous embodiments, the casing extends as a full hoop structure about an axis of rotation of the turbine rotor.

In another embodiment according to any of the previous embodiments, the casing extends as a full hoop structure about an axis of rotation of the turbine rotor. The forward case hook and the aft case hooks on the static casing are circumferentially offset. The forward case mount hook and the aft case mount hook on the attachment block are circumferentially offset.

In another featured embodiment, a method of assembling a blade outer air seal assembly into a gas turbine engine includes the steps of providing a plurality of blade outer air seals, and there are wedge seals positioned circumferentially intermediate the plurality of blade outer air seals to form an intermediate assembly. The intermediate assembly is moved into an attachment block, with the plurality of blade outer air seals having forward and aft hooks supported on forward and aft blade outer air seal hooks on the attachment block. Forward and an aft case mount hooks of the attachment blocks are provided. The forward and aft case mount hooks and forward and aft case mount hooks on the attachment blocks face a common axial direction. The forward and aft case mount hooks on the attachment blocks are moved onto forward and aft case hooks on a static casing, with the forward and aft case hooks on the static casing also facing a common axial direction, which is opposed to the common axial direction.

In another embodiment according to the previous embodiment, the wedge seals include portions positioned radially inward of the forward and aft seal hooks of the attachment block. There are stops formed on the wedge seal circumferentially between the forward and aft hooks on, the blade outer seals adjacent ones of hooks.

In another embodiment according to any of the previous embodiments, the forward and aft seal hooks on the attachment block extend circumferentially beyond circumferential edges of the blade outer air seals forward and aft hooks.

In another embodiment according to any of the previous embodiments, the wedge seal has a curved radially inner surface.

In another embodiment according to any of the previous embodiments, the curved radially inner surface of the wedge seal seals against a frusto-conical surface on the blade outer air seal.

In another embodiment according to any of the previous embodiments, the forward and aft case mount hooks on the attachment blocks are circumferentially spaced. The forward and aft case hooks on the static casing are also circumferentially spaced such that the forward case mount hooks on the attachment blocks can move intermediate the aft case hooks on the static casing when the attachment blocks are moved into a mount location on the static case.

In another embodiment according to any of the previous embodiments, the forward case mount hooks on the attachment blocks are circumferentially aligned with the forward case hooks on the static casing during step (c).

In another featured embodiment, a gas turbine engine includes a compressor section and a turbine section. The turbine section includes at least one rotor and at least one blade extending radially outwardly from the rotor to a radially outer tip. A plurality of blade outer air seal assemblies are positioned radially outwardly of the radially outer tip of the blade. The blade outer air seals have forward and aft hooks. The forward and aft hooks are supported on forward and aft seal hooks of a plurality of attachment blocks. The attachment blocks are supported on a static casing within the engine. Wedge seals span a circumferential gap between adjacent ones of the plurality of blade outer air seals the wedge seals include portions positioned radially inward of the forward and aft seal hooks of the attachment block. There are stops formed on the wedge seal circumferentially between the forward and aft hooks on the blade outer seals the forward and aft seal hooks on the attachment block extending circumferentially beyond circumferential edges of the blade outer air seals forward and aft hooks.

In another embodiment according to the previous embodiment, the wedge seal has a curved radially inner surface.

In another embodiment according to any of the previous embodiments, the curved radially inner surface of the wedge seal seals against a frusto-conical surface on the blade outer air seal.

In another embodiment according to any of the previous embodiments, the curved radially inner surface of the wedge seal seals on a curved surface of the blade outer air seal.

These and other features may be best understood from the following drawings and specification.

BRIEF DESCRIPTION OF THE DRAWINGS

FIG. 7A shows a first assembly step.
FIG. 7B shows a subsequent assembly step.

DETAILED DESCRIPTION

Figure 1:
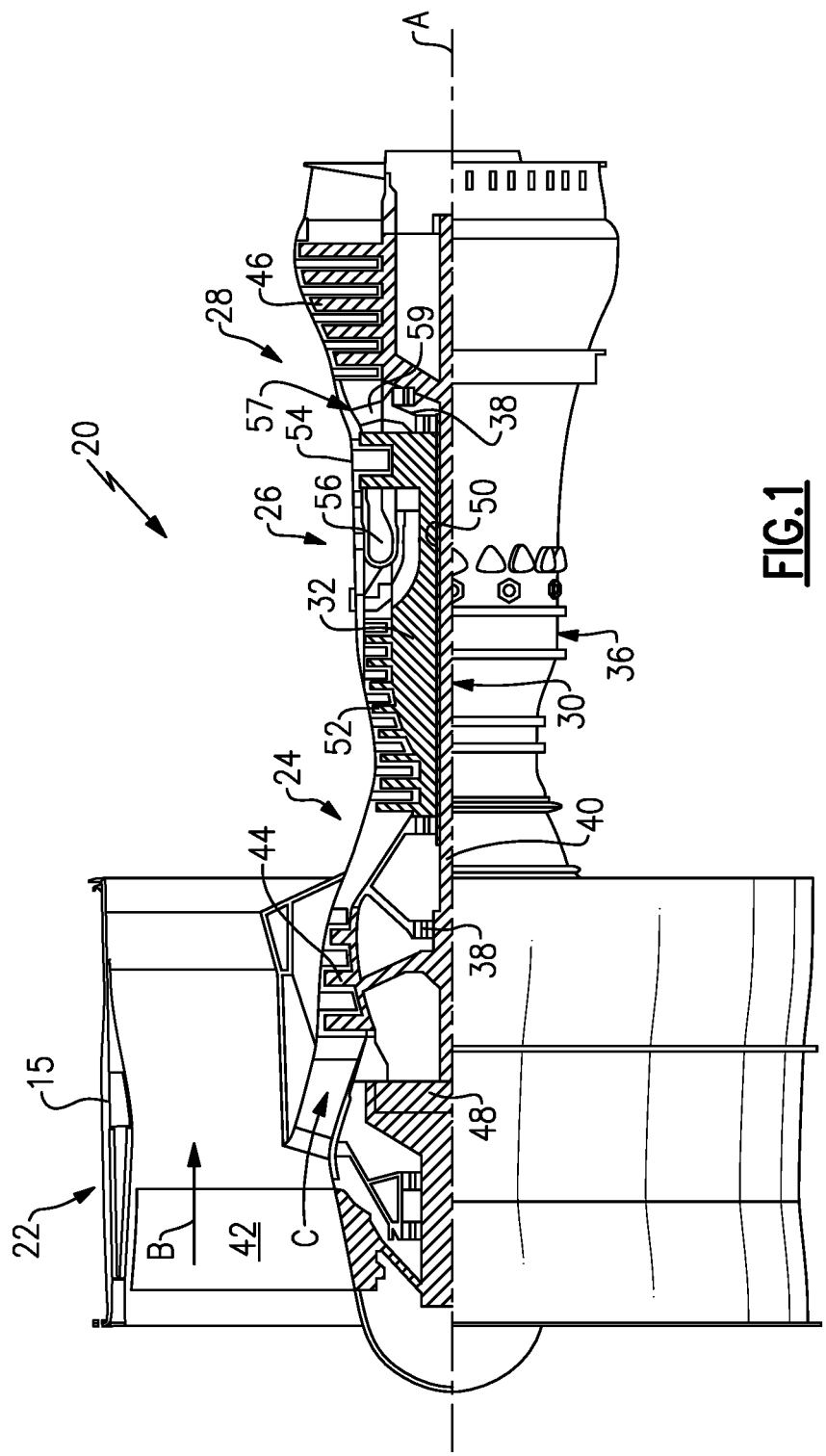
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
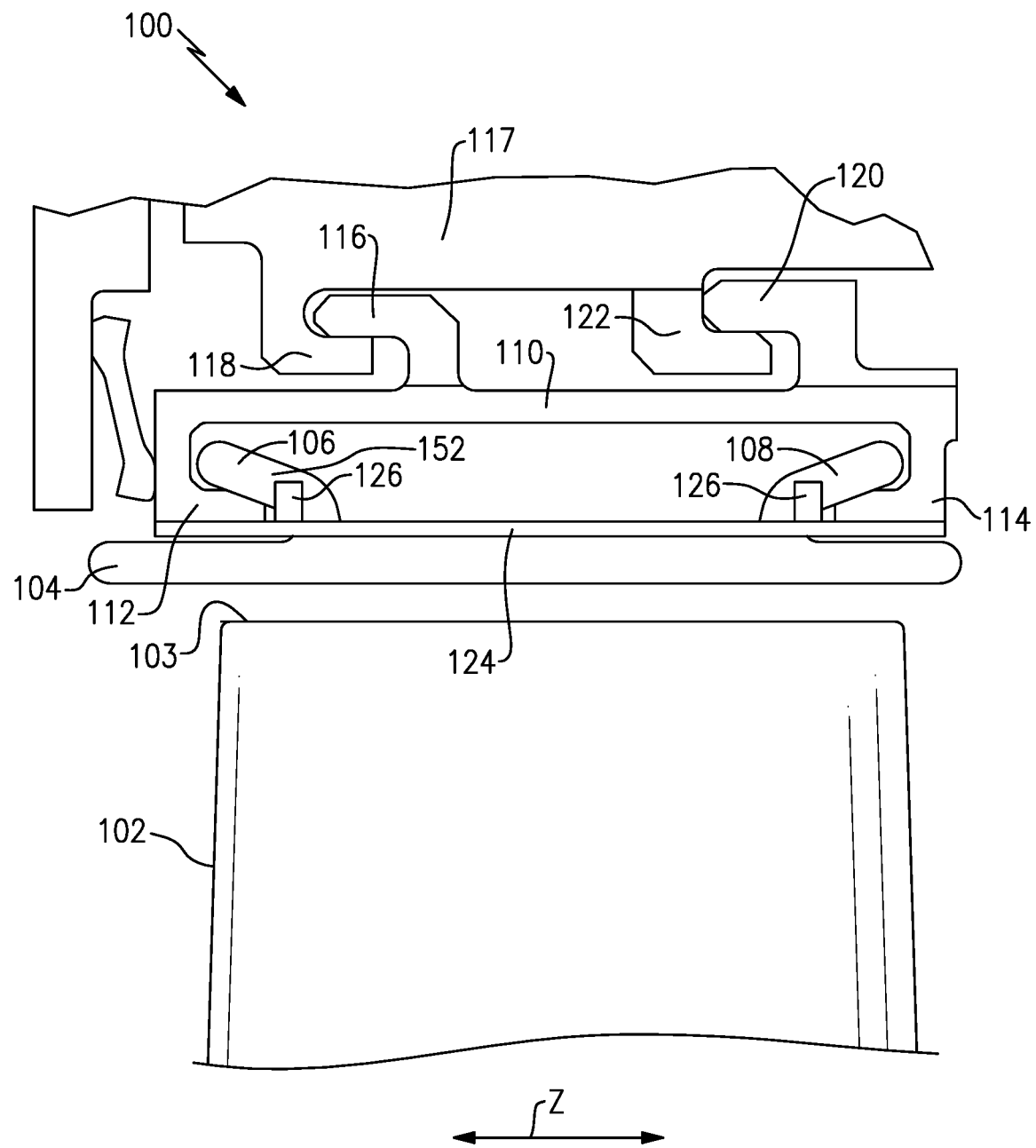
FIG. 2 shows a turbine section.

FIG. 2 shows a turbine section 100, which may be incorporated into a gas turbine engine such as the one shown in FIG. 1. However, it should be understood that the turbine section 100 could be utilized in other gas turbine engines, and even gas turbine engines not having a fan section at all.

A turbine blade 102 has a radially outer tip 103 that is spaced from a blade outer air seal ("BOAS") 104. The BOAS may be formed of a ceramic matrix composite ("CMC"). A forward hook 106 and an aft hook 108 are formed on the BOAS 104. A support block 110 includes a rearwardly facing forward hook 112 supporting forward hook 106 and a forwardly facing aft hook 114 supporting aft hook 108. The CMC BOAS may be formed of lamina. Alternatively the BOAS may be a monolithic ceramic, or even metallic.

As shown, the attachment block 110 is supported on a static support or engine case 117. Case 117 has a rearwardly facing forward hook 118 supporting forwardly facing forward hook 116 of the attachment block 110. The case 117 has a rearwardly facing aft hook 122 supporting a forwardly facing aft hook 120 on the attachment block. Case 117 may extend for a full 360° about a rotational axis Z of blade 102.

It should be understood that the arrangement of the hooks 118 and 120 and 116 and 118 could be reversed such that hooks 118 and 122 face forwardly and hooks 116 and 120 face rearwardly. However, in one aspect of this disclosure, the hooks 116 and 120 face in a common axial direction and the hooks 118 and 122 face in an opposed axial direction. That is, while the hooks 118 and 122 face in the same axial direction, and the hooks 116 and 120 face in the same axial direction, the books 112 and 114 face in distinct axial directions, as do the hooks 106 and 108. It is also clear from this Figure that the hooks 112 and 114 have a portion that is axially outward of the hooks 116 and 120.

A wedge seal 124 and stops 126 can also be seen.

Figure 3:
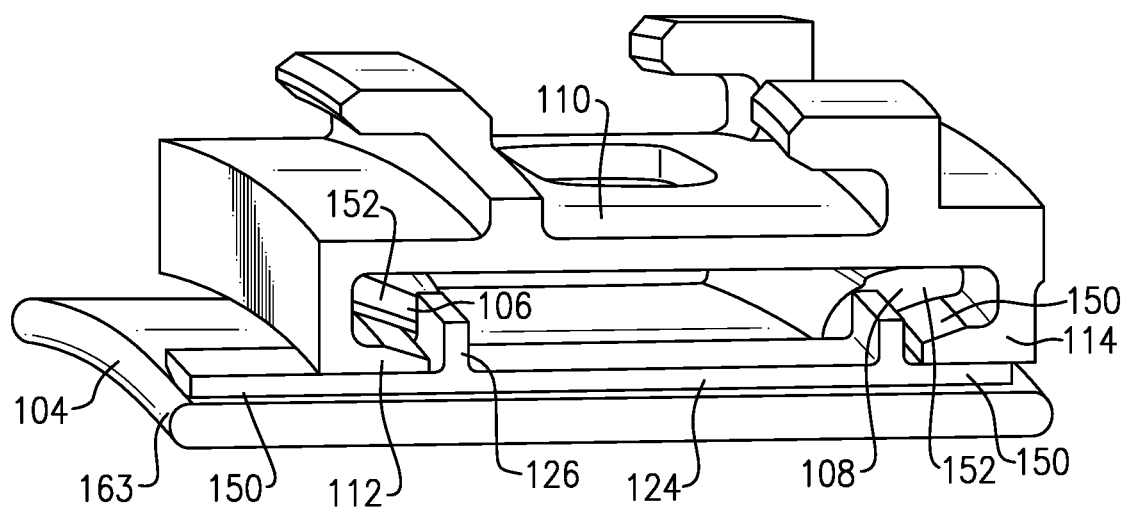
FIG. 3 shows a detail of a blade outer air seal.

FIG. 3 shows a detail of a BOAS assembly. The BOAS 104 is shown having hooks 106 and 108 supported on the block 110. A wedge seal 124 is shown having stops 126. Wedge seal and stops 126 abut an end 152 of the hooks 106 and 108. The wedge seal 124 further has axially outer portions 150 received radially between the hook portions 112 and 114, and a portion 163 of the BOAS 104 which is circumferentially beyond the hooks 106 and 108. In this manner, the wedge seals 124 are supported against rotation and against axial movement. As can be clearly seen in FIG. 3, the stops 126 are positioned axially between the hooks 112 and 114 such that the hooks 112 and 114 prevent axial movement of the wedge seal 124.

Figure 4:
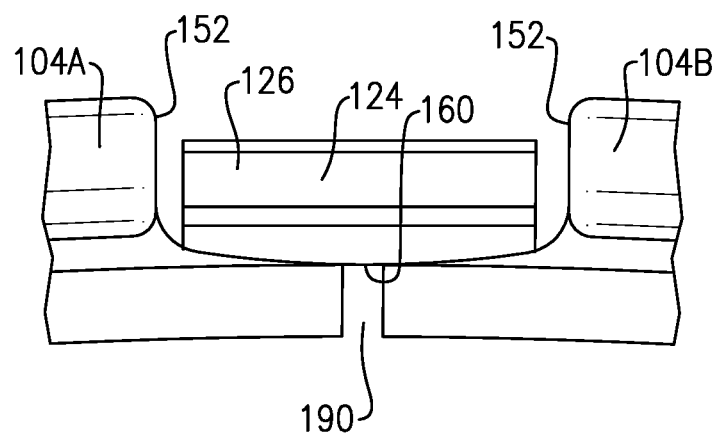
FIG. 4 shows a detail of adjacent blade outer air seals.

FIG. 4 shows a detail wherein the wedge seals 124 span a gap 190 between adjacent BOAS 104A and 104B. The wedge seal 124 is shown to have a radially inner surface 160 which is somewhat curved.

Figures 5A, 5B:
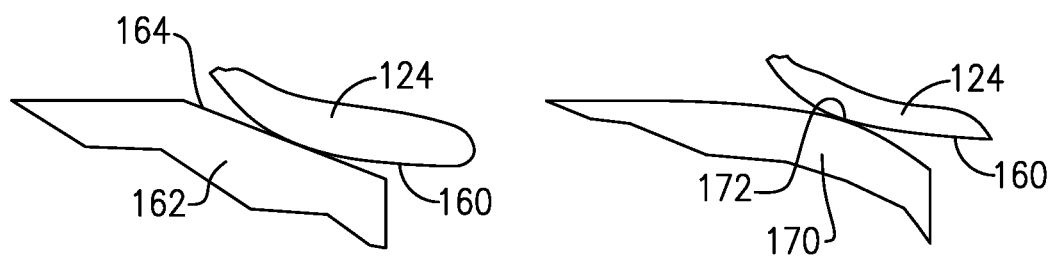
FIG. 5A shows one embodiment.
FIG. 5B shows an alternative embodiment.

As shown in FIG. 5A, the curved surface 160 may seal against a relatively frusto-conical surface 164 of a BOAS 162.

FIG. 5B shows an alternative where the BOAS 170 has a curved surface 172 sealed against the curved surface 160.

Figure 6:
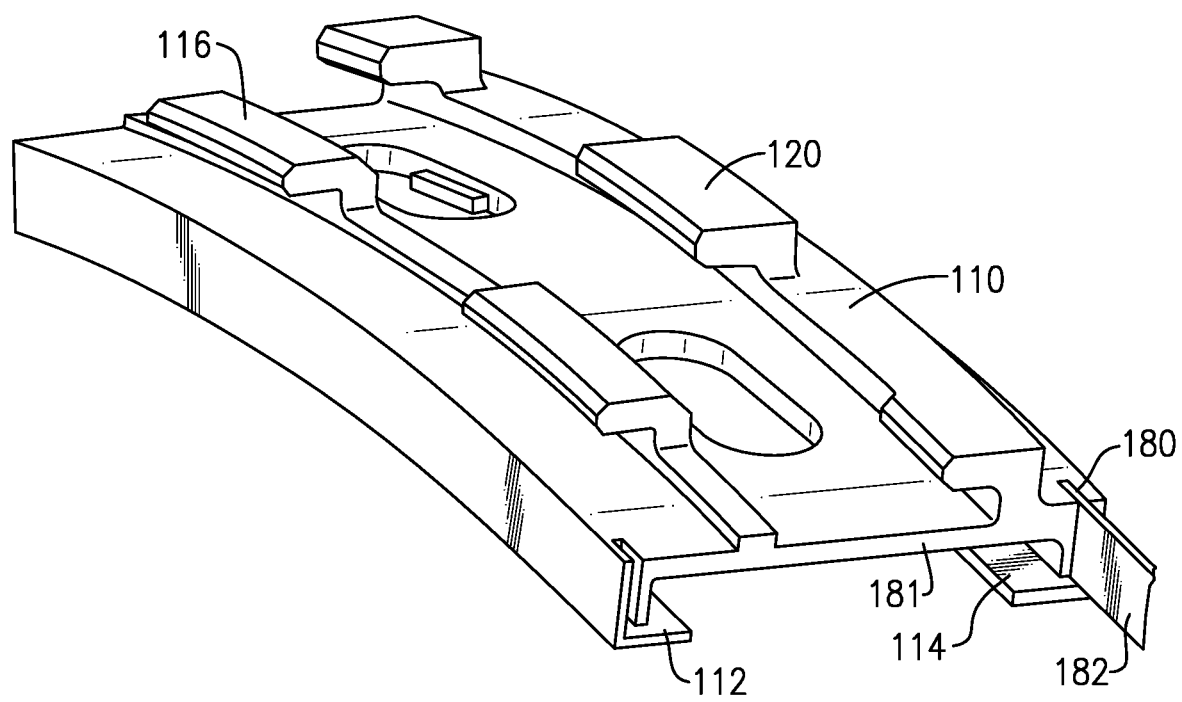
FIG. 6 shows a detail of a blade outer air seal support.

FIG. 6 shows details of the attachment block 110. The hooks 112 and 114 face each other whereas the hooks 116 and 110 face a common axial direction, here forwardly. A feather seal 182 is shown received in a slot 180 at a circumferential end 181. The feather seals 182 will span a gap between adjacent attachment blocks.

FIG. 7A shows an assembly detail. An intermediate product 200 is provided wherein a plurality of BOAS 104A and 104B are assembled with at least one wedge seal 124 circumferentially intermediate attachment hooks on the BOAS 104A and 104B.

This intermediate product 200 is then mounted within a plurality of attachment blocks 110, as shown in FIG. 7B. As can be appreciated, the assembly at this point resembles that as shown in FIG. 3. The forward facing hooks 116 and 120 now facilitate movement of the assembly into the full hoop case or attachment structure 117. That is, the hooks 116 and 120 can move in a single axial direction onto the hooks 118 and 122 such that a full hoop support 117 can be utilized and still facilitate the easy assembly of the BOAS assembly. Full hoop support 117 has scalloped hook regions 118 and 122 to accept axial assembly of intermediate support 110 hooks 116 and 120.

Gaps 202 are shown between the adjacent attachment blocks 110 and a feather seal 182 may span this gap.

As understood, the term "full hoop" means that the casing 117 extends for 360° about an axis of rotation X of the turbine, such as shown in FIG. 2, as an example.

Figure 7C:
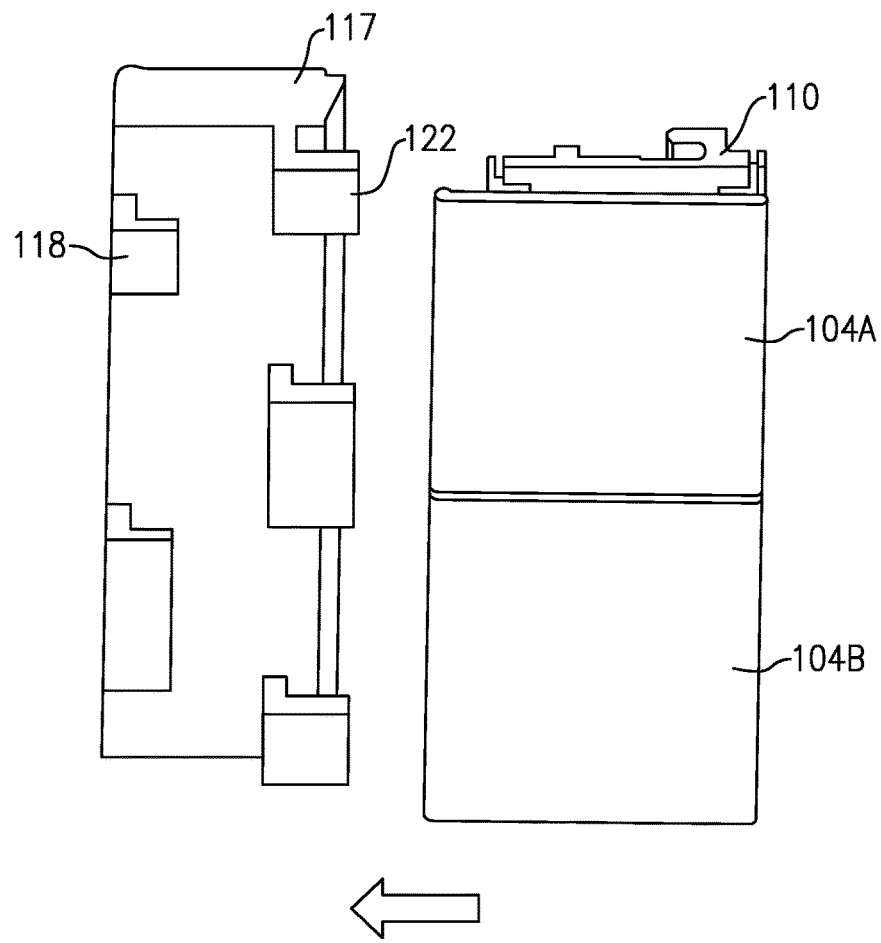
FIG. 7C shows a detail of the FIG. 7B step.

As shown in FIG. 7C the forward case hooks 118 and aft case hooks 122 are circumferentially offset. This facilitates the movement of the combined attachment blocks 110 and BOAS 104A and B as shown in FIG. 7B into a mount position on the casing 117.

Figure 7D:
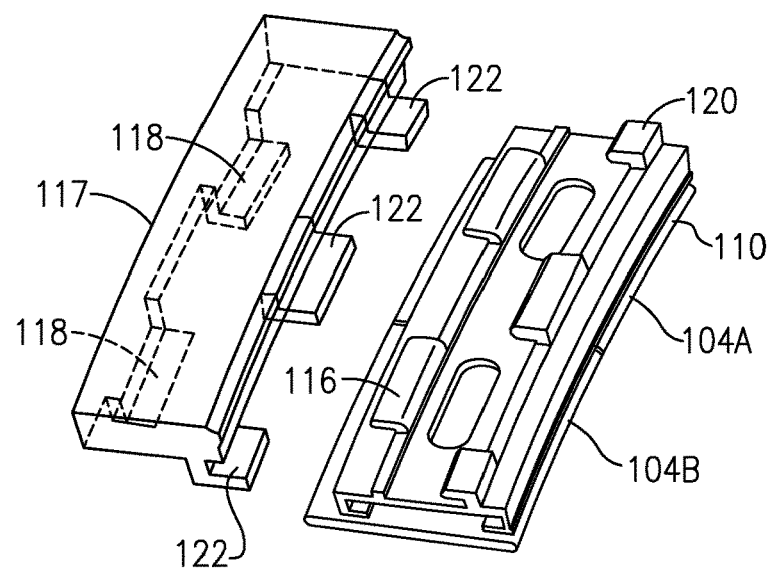
FIG. 7D shows further details.

As shown in FIG. 7D the forward case mount hooks 116 and the aft case hooks 122 are also circumferentially offset. As can be appreciated from FIG. 7D hooks 116 can be moved intermediate the hooks 122 such that the hooks 116 can then register and be supported on the hooks 118, with the hooks 120 then being supported on the hooks 122. Hooks 116 are circumferentially aligned with hooks 118 during this movement.

Thus, a full hoop casing 117 can be utilized while still easily receiving and supporting the combined BOAS and attachment block structure.

A gas turbine engine under this disclosure could be said to have a compressor section and a turbine section. The turbine section includes at least one rotor and at least one blade extending radially outwardly from the rotor to a radially outer tip. A blade outer air seal assembly 104 is positioned radially outwardly of the radially outer tip of the blade and has forward and aft hooks 106/108. The forward and aft hooks are supported on forward and aft seal hooks 112/114 of an attachment block. The attachment block has a forward case mount hook 116 and an aft case mount hook 120 supported on a forward case hook 118 and an aft case hook 122 of a static casing within the engine. The forward case mount hook and the aft case mount hook on the attachment block face in a common axial direction. The forward case hook and the aft case hook face in a common axial direction which is opposed to the common axial direction.

A method of assembling a blade outer air seal assembly into a gas turbine engine could be said to includes the steps of providing a plurality of blade outer air seals 104, and wedge seals 124 positioned circumferentially intermediate the plurality of blade outer air seals to form an intermediate assembly. The intermediate assembly is moved into an attachment block 110, with the plurality of blade outer air seals having forward and aft hooks 106/108 supported on forward and aft blade outer air seal hooks 112/114 on the attachment block. Forward and an aft case mount hooks 116/120 are provided on the attachment blocks. The forward and aft case mount hooks and forward and aft case mount hooks on the attachment blocks facing a common axial direction. There is the step of moving the forward and aft case mount hooks on the attachment blocks onto forward and aft case hooks on a static casing, with the forward and aft case hooks on the static casing also facing a common axial direction, which is opposed to the common axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:

a compressor section and a turbine section, said turbine section including at least one rotor and at least one blade extending radially outwardly from said rotor to a radially outer tip;

a blade outer air seal positioned radially outwardly of said radially outer tip of said blade, said blade outer air seal having forward and aft hooks, and said forward and aft hooks being supported on forward and aft seal hooks of an attachment block;

said attachment block having a forward case mount hook and an aft case mount hook, and said attachment block being supported on a forward case hook and an aft case hook of a static casing within the engine, and said forward case mount hook and said aft case mount hook on said attachment block facing in a common axial direction, and said forward case hook and said aft case hook facing in a common axial direction which is opposed to said common axial direction of said forward case mount hook and said aft case mount hook on said attachment block;

said blade outer air seal forward and aft hooks facing in distinct axial directions relative to each other and said forward and aft seal hooks of said attachment block also facing in distinct axial directions relative to each other;

wherein there are a plurality of said blade outer air seals mounted within said casing, and there being at least one wedge seal spanning a circumferential gap between adjacent ones of said plurality of blade outer air seals;

wherein said at least one wedge seal includes portions positioned radially inward of said forward and aft seal hooks of said attachment block, and there being stops formed on said at least one wedge seal circumferentially between forward and aft hooks of adjacent blade outer air seals;

wherein said forward and aft seal hooks on said attachment block extend circumferentially beyond circumferential edges of said blade outer air seals forward and aft hooks;

said stops positioned axially between the forward and aft seal hooks of the attachment block, such that the forward and aft seal hooks of the attachment block prevent axial movement of said at least one wedge seal; and wherein said forward and aft seal hooks on the attachment block each have a portion that is axially outward of the forward and aft case mount hooks, respectively.

2. A gas turbine engine comprising:

a compressor section and a turbine section, said turbine section including at least one rotor and at least one blade extending radially outwardly from said rotor to a radially outer tip;

a plurality of blade outer air seals positioned radially outwardly of said radially outer tip of said blade, said blade outer air seals having forward and aft hooks, and said forward and aft hooks being supported on forward and aft seal hooks of a plurality of attachment blocks;

said attachment blocks supported on a static casing within the engine;

wedge seals spanning a circumferential gap between adjacent ones of said plurality of blade outer air seals, said wedge seals include portions positioned radially inward of said forward and aft seal hooks of said attachment blocks, and there being stops formed on said wedge seals circumferentially between said forward and aft hooks on said blade outer air seals, said forward and aft seal hooks on said attachment blocks extending circumferentially beyond circumferential edges of said blade outer air seals forward and aft hooks;

said forward and aft hooks of said blade outer air seals facing in distinct axial directions relative to each other and said forward and aft seal hooks of said attachment blocks also facing in distinct axial directions relative to each other;

wherein there are a plurality of said blade outer air seals mounted within said casing, and there being at least one wedge seal spanning a circumferential gap between adjacent ones of said plurality of blade outer air seals;

wherein said at least one wedge seal includes portions positioned radially inward of said forward and aft seal hooks of said attachment blocks, and there being stops formed on said at least one wedge seal circumferentially between said forward and aft hooks of adjacent blade outer air seals;

wherein said forward and aft seal hooks on said attachment blocks extend circumferentially beyond circumferential edges of said blade outer air seals forward and aft hooks;

said stops positioned axially between the forward and aft seal hooks of the attachment blocks, such that the forward and aft seal hooks of the attachment blocks prevent axial movement of said at least one wedge seal; and wherein said forward and aft seal hooks on the attachment blocks each have a portion that is axially outward of the forward and aft case mount hooks, respectively.

* * * * *